G. W. BUTTLES.
CLOTHES LINE REEL.
APPLICATION FILED JUNE 2, 1909.
969,598.
Patented Sept. 6, 1910.
2 SHEETS—SHEET 1.
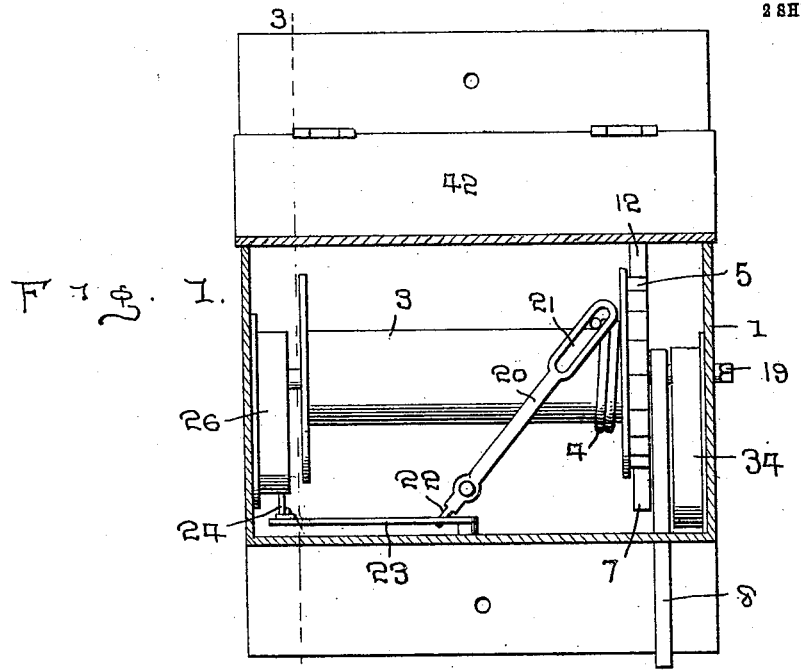
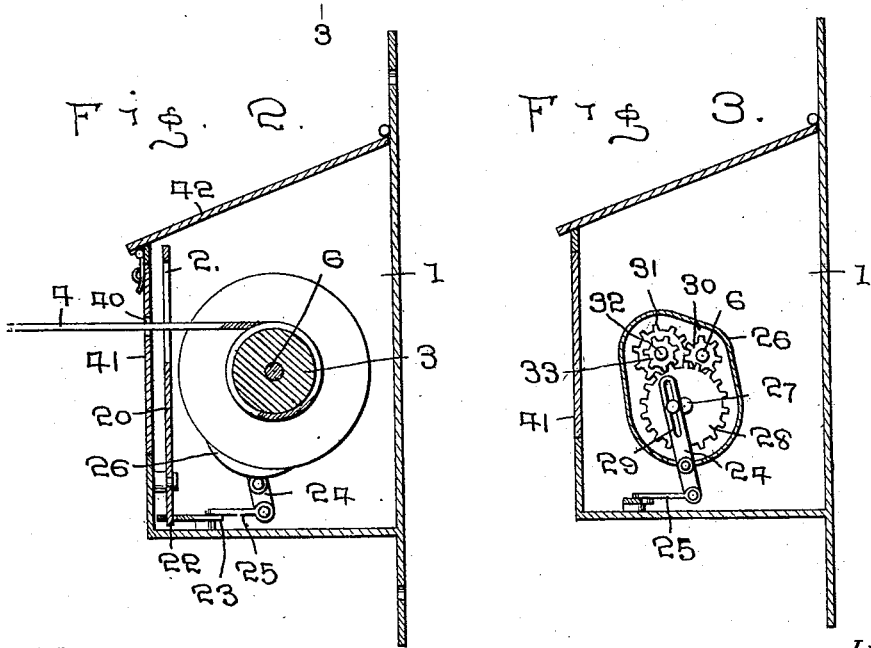
WITNESSES:
INVENTOR
G. W. Buttles
BY
W. J. FitzGerald & Co.
Attorneys

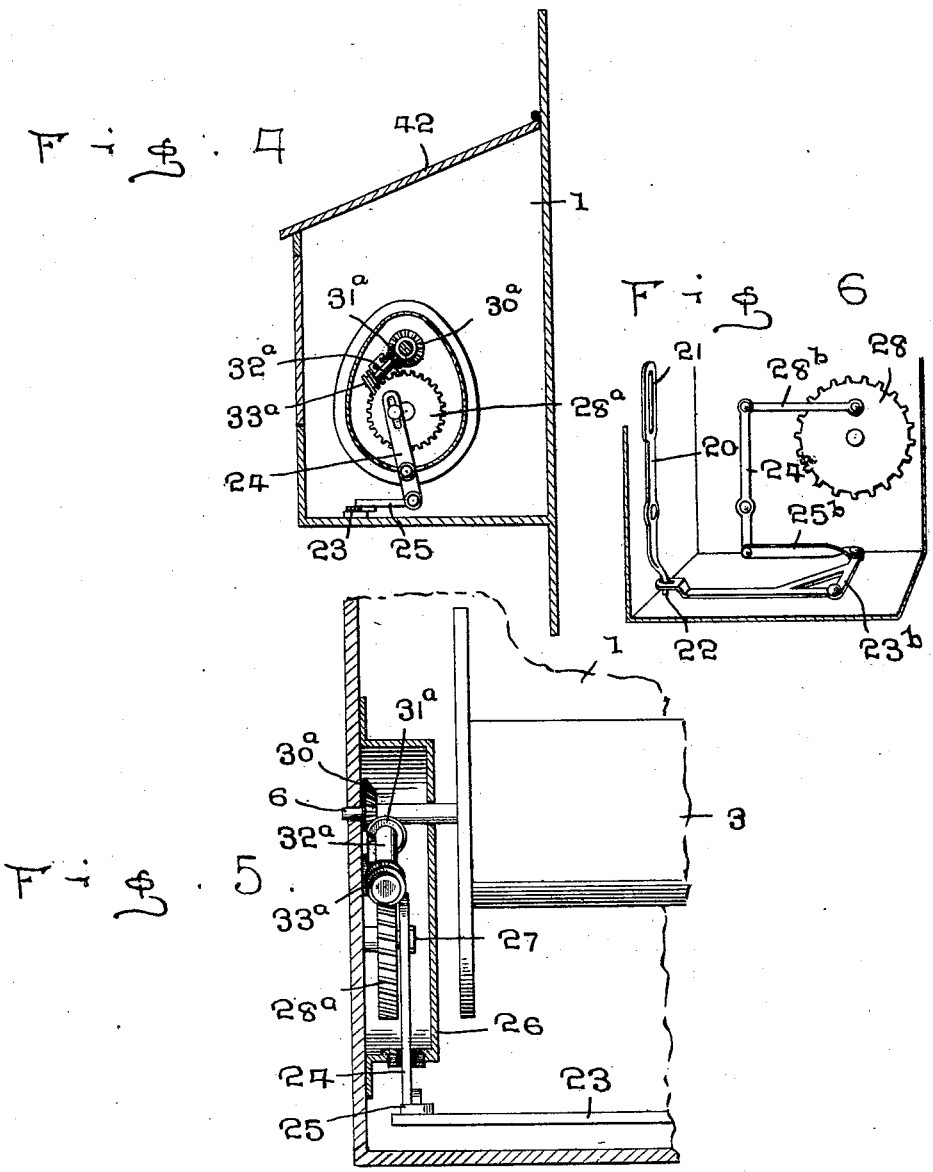

UNITED STATES PATENT OFFICE.

GILBERT W. BUTTLES, OF APPLETON, WISCONSIN.

CLOTHES-LINE REEL.

969,598.

Specification of Letters Patent. Patented Sept. 6, 1910.

Application filed June 2, 1909. Serial No. 499,825.

*To all whom it may concern:*

Be it known that I, GILBERT W. BUTTLES, a citizen of the United States, residing at Appleton, in the county of Outagamie and State of Wisconsin, have invented certain new and useful Improvements in Clothes-Line Reels; and I do hereby declare the following to be a full, clear, and exact description of the invention, such as will enable others skilled in the art to which it appertains to make and use the same.

My invention relates to new and useful improvements in a combined clothes line reel and housing therefor and my object is to rotatably mount a drum in a suitable housing upon which the clothes line is to be wound.

A further object is to provide means for manually rotating the drum to re-wind the clothes line thereon and to draw the line taut when in use.

A further object is to provide means for automatically guiding the line onto the drum.

A still further object is to provide means for holding the drum against rotation when the line is drawn taut.

Other objects and advantages will be hereinafter referred to and more particularly pointed out in the claims.

In the accompanying drawings forming part of this application, Figure 1 is a longitudinal sectional view through the housing, showing clearly the line guiding mechanism. Fig. 2 is a vertical, central transverse sectional view through the housing, showing the line extended therefrom. Fig. 3 is a sectional view as seen on line 3—3, Fig. 1. Fig. 4 is a view similar to Fig. 3, showing a modified form of gearing. Fig. 5 is an edge elevation of the gearing shown in Fig. 4, the surrounding housing being shown in section, and, Fig. 6 is a perspective view of a slightly modified means for shifting the line as it is being wound upon the spool.

Referring to the drawings in which similar reference numerals designate corresponding parts throughout the several views, 1 indicates a housing, which may be constructed in any preferred manner, which housing is adapted to be secured to a post, or other suitable object.

Rotatably mounted within the housing is a drum 3, upon which is adapted to be wound the usual or any preferred form of clothes line 4 and in order to wind the line upon the drum manually, a ratchet 5 is fixed to the shaft 6 at one end of the drum, with which coöperates a pawl 7, said pawl being pivotally mounted on a lever 8, which lever is pivotally mounted at its upper end on the shaft 6, while the lower end thereof extends through a slot in the bottom of the housing 1 and is readily accessible to the attendant.

The pawl 7 is normally held in engagement with the teeth on the ratchet and by moving the lever in one direction, said ratchet and drum are rotated and the line 4 wound around said drum, and to prevent the backward movement of said drum, a latch 12 is adapted to engage said ratchet and coöperate with said lever.

The line 4 is caused to wind upon the drum evenly and from end to end thereof by pivotally mounting upon the forward wall of the housing, a guide arm 20, said arm being pivoted adjacent its lower end, while the upper end thereof is provided with an elongated slot 21, through which the line extends and as the upper end of said guide arm is swung in the arc of a circle, the line will be properly wound upon the drum. The lower end of the guide arm 20 is provided with a pintle 22, which extends through an opening in one end of a bell-crank lever 23, said lever being pivotally mounted on the floor of the box and having one of its arms attached to a rocking arm 24 through the medium of a link 25 and as said arm 24 is rocked back and forth, the guide arm 20 will be swung in the arc of a circle.

The rocking arm 24 is pivotally mounted in any suitable manner and extends into a casing 26, which is located adjacent one end of the drum 3 and engages a pin 27 eccentrically mounted on a gear wheel 28, said pin extending through a slot 29 in the arm 24 and as said gear wheel is rotated, the arm 24 will be rocked back and forth on its pivot.

The gear 28 is driven by attaching to the shaft 6, a pinion 30, which meshes with a gear 31 mounted in the casing 26, the shaft 32 for the gear 31 having a pinion 33 fixed thereon, which meshes with the gear 28 and by this means it will be readily seen that when the drum 3 and shaft 6 upon which the same is mounted, are rotated, the gear 28 will likewise be rotated and the guiding mechanism operated.

Instead of employing the form of gears shown in Fig. 3, for operating rocking arm 24 the shaft 6 may be provided with a bevel gear 30$^a$, with which meshes a bevel pinion 31$^a$ on a worm shaft 32$^a$, said worm shaft engaging a worm gear 28$^a$ at its opposite end, said worm gear carrying a pin 27 similar to the gear 28.

The line 4 is extended through a slot 40 formed in a door 41 in the forward wall of the housing and ready access may be had to the housing by opening said door or by providing a swinging closure 42 at the upper end of said housing; the closure 42 being preferably disposed at an incline whereby water or the like will be caused to leave the housing.

In Fig. 6, the rocking arm 24$^a$ is pivotally attached to the casing at one side of the gear 28 and connected to the gear by means of a pitman 28$^b$, a link 25$^b$ connecting said rocking arm 24$^a$ to a bell-crank lever 23$^b$, in turn connected to the guide arm.

From the foregoing, it will be seen that I have provided a very cheap and economical means for storing the clothes line in a suitable housing and it will likewise be seen that this result may be readily accomplished manually.

It will further be seen that by providing the guiding mechanism for the line, said line will be evenly wound upon the drum and the full length of the drum utilized.

What I claim is:

1. In a device of the character described, the combination with a housing, a shaft extending longitudinally therethrough and a line winding drum mounted on said shaft; of a guide arm pivoted to one wall of said housing and having a line-receiving slot therein, means to actuate said shaft and drum, a rocking arm having a slot in one end thereof, driving means for said rocking arm, an eccentric pin carried by said last mentioned driving means and coöperating with the slot in said rocking arm, and intermediate operating means between the opposite end of said rocking arm and said guide arm, for the purpose described.

2. In a device of the character described, the combination with a housing, a shaft extending longitudinally therethrough and a line-winding drum mounted on said shaft; of a guide arm pivoted to one wall of said housing and having a line-receiving slot therein, means to actuate said drum, a rocking arm mounted on another wall and adapted to be rocked on rotation of said drum, a bell crank lever pivotally mounted on the floor of said housing and having one end in engagement with said guide arm and a link connecting said rocking arm with the opposite end of said lever, whereby when said shaft and drum are rotated, said guide arm will move in the arc of a circle.

3. In a device of the character described, the combination with a housing, a shaft extending longitudinally therethrough and a line-winding drum mounted on said shaft; of a guide arm pivoted to one wall of said housing and having a line-receiving slot therein, a rocking arm pivotally mounted on another wall of said housing and having a slot in one end thereof, a gearing mechanism between said shaft and said rocking arm comprising a gear provided with an eccentric pin, said pin being located in the slot of said rocking arm, a bell crank lever pivotally mounted to the floor of said housing and having one end in engagement with said guide arm and a link having engagement with said rocking arm and the opposite end of said lever, and means to rotate said shaft and drum, for the purpose described.

In testimony whereof I have signed my name to this specification in the presence of two subscribing witnesses.

GILBERT W. BUTTLES.

Witnesses:
F. REUSCHLEIN,
W. H. BUSHMAN.